Patented Aug. 1, 1939

2,167,927

UNITED STATES PATENT OFFICE 2,167,927

HALO-SUBSTITUTION OF ETHYLENE

Herbert P. A. Groll and George Hearne, Berkeley, and James Burgin and Donald S. La France, Oakland, Calif., assignors to Shell Development Company, San Francisco, Calif., a corporation of Delaware No Drawing. Application March 4, 1938, Serial No. 193,848

18 Claims. (Cl. 260—656)

This invention relates to a process for effecting the halogenation, via substitution, of ethylene and ethylene halo-substitution products.

More particularly, the invention provides a practical and economical process for the conversion of ethylene to vinyl halides.

The process is essentially a halo-substitution process which is executed at elevated temperatures. Ethyelene or an ethylene halo-substitution product is reacted with a halogen, in the presence or in the absence of a catalyst, at an elevated temperature at which direct halogen substitution takes place but below the temperature at which substantial degradation such as cracking and/or polymerization of the organic reactant and/or products occurs.

A principal object of the invention is to provide a process for the direct chlor-substitution of ethylene to vinyl chloride, which novel process is particularly well adapted to technical scale operation, involves the use of inexpensive and readily available starting materials, involves the use of inexpensive equipment which is easily operated at low cost, and which results in substantially quantitative yields of vinyl chloride.

As far as we are aware, there is no known process for the direct halogenation of ethylene to a vinyl halide. Vinyl chloride is prepared by three general methods: (1) by splitting hydrogen chloride from ethylene dichloride by pyrolysis; (2) by splitting hydrogen chloride from ethylene dichloride or ethylidine chloride by heat treatment with a base; and (3) by reacting acetylene with hydrogen chloride. These methods are unsatisfactory for technical scale production because of the relatively high cost of the starting materials, because of the high cost and difficulties involved in executing them, and because of the relatively low yields obtainable.

The high temperature halo-substitution reaction which takes place when ethylene is reacted with a halogen in accordance with the process of the present invention is totally unrelated to the so-called "induced substitution" reaction observed in the halogenation of ethylene at low temperatures. The halo-substitution reaction of the process of the invention involves direct reaction of the halogen and ethylene whereby a hydrogen atom of the ethylene is substituted by a halogen atom to result in the formation of a vinyl halide and a hydrogen halide. The "induced substitution" reaction which invariably accompanies the halogen addition reaction when ethylene is reacted with a halogen at temperatures up to 200° C. and higher is not a reaction involving the halo-substitution of ethylene; it is the reaction of free halogen with the saturated ethylene dihalide formed by occurrence of the halogen addition reaction to form a more highly halogenated saturated product, namely, a trihaloethane. The mechanism of this well-known "induced substitution" reaction has been conclusively established by experimental evidence. To avoid the excessive occurrence of the "induced substitution" reaction, the prior investigators recommend the use of low temperatures, that is, temperatures lower than about 120° C., and teach that at higher temperatures the losses due to the occurrence of the substitution reaction would be prohibitive. We have reacted chlorine with ethylene under the conditions at which the art teaches that the "induced substitution" reaction occurs to a great extent. In no case could vinyl chloride be detected in the reaction products, showing that absolutely no chlor-substitution of the ethylene took place. However, at the low temperatures the only substitution reaction which occurred was the so-called "induced substitution", that is, reaction of chlorine with the saturated ethylene dichloride to yield the saturated trichlorethane.

The process of the invention is executed at a temperature at least equal to 200° C. In the reaction of ethylene with chlorine, we have found that the chlor-substitution reaction to form vinyl chloride does not occur to any appreciable extent until a temperature of about 210° C. is reached. When ethylene is reacted with bromine, the halo-substitution reaction begins to occur at a slightly lower temperature. The upper limit of the operating temperature range is determined by the stability of the ethylene and/or the unsaturated reaction product under the conditions existing in the reactor. For example, when optimum practical yields are desired the operating temperature should be below those temperatures, under the prevailing conditions of contact time, pressure, degree of dilution, etc., at which degradation reactions such as cracking, polymerization, splitting out of a hydrogen halide, and the like, are favored. A preferred range of operating temperatures is from about 200° C. to about 700° C. A preferred temperature range for the production of vinyl chloride is from 300° C. to 500° C. At temperatures around 400° C., the conversion of the ethylene to vinyl chloride is practically quantitative, and the reaction product is substantially free of either dichlorethane or trichlorethane. That the vinyl halides are formed by direct halo-substitution of the ethylene and not by pyrolysis of any intermediately formed dihaloethane is shown by the fact that the dihaloethanes are substantially stable at the temperatures and other conditions at which substantially complete halo-substitution of ethylene to the corresponding vinyl halide may be effected.

Since ethylene and the halogens react by addition quite rapidly when they are brought together at temperatures below about 200° C., it is necessary, if a product substantially free of halogen addition products is to be obtained, that the reactants be brought together at an elevated temperature so high that substantially no halogen addition occurs. Mixing the reactants at about room temperature and passing the mixture into the heated reaction zone may result in considerable amounts of the halogen addition product because the undesired halogen addition reaction may take place to a substantial extent before the mixture is subjected to the high temperature at which the halo-substitution is favored and the halogen addition suppressed. The reactants can be brought together at a sufficiently elevated temperature to substantially obviate halogen addition in a variety of suitable manners. Either one or both of the reactants may be preheated and mixing effected at a sufficiently elevated temperature. For example, the ethylene may be preheated to such a temperature that the temperature of the mixture resulting on introduction of the halogen, either heated or cold, into it is sufficiently high, that is, from about 200° C. to about 700° C. Higher preheating temperatures are required when only one of the reactants is preheated. The maximum temperature to which the ethylene can be preheated is to a certain extent fixed by the temperature at which it undergoes excessive cracking. Excessive carbon formation in the ethylene preheater may be inhibited by maintaining an effective amount of hydrogen sulphide, hydrogen selenide, hydrogen telluride or the like carbon formation-inhibiting agent in the ethylene feed, or by pretreating the walls of the preheater, when a metal preheater is used, with such a carbon formation-inhibiting agent. By use of such or similar procedures, higher preheating temperatures than would otherwise be practicable may be employed. It is to be understood that it is not essential to the successful execution of the process that any preheating of either of the reactants be resorted to. If desired, particularly when it is immaterial if small amounts of ethylene dihalide and other saturated products are formed, the reactants may be mixed at room temperature and the temperature of the mixture relatively rapidly raised to the desired reaction temperature.

When the reactants are preheated and there is danger of explosion or flaming at the mixing temperature, such difficulties may be obviated by using suitable mixing jets and regulating the relative velocities at which the reactants are brought into contact. For example, the halogen may be added to a stream of the preheated unsaturated organic compound and flaming avoided by injecting the halogen into the stream of the organic compound at a velocity exceeding the velocity of flame propagation at the mixing temperature. The halogen may be introduced at a plurality of separate points along the reaction tube while the material undergoing halo-substitution is maintained within the desired reaction temperature range, and any desired degree of halo-substitution effected with safety in a single operation. In certain cases, it is desirable to make use of relatively high space velocities and turbulent flow of the reaction mixture through the reaction tube to prevent the occurrence of flame and its concomitant production of carbon, and to permit the use of higher reaction temperatures than would otherwise be practicable. The high velocity enables the gaseous mixture to traverse the reaction zone at a velocity in excess of that of flame propagation, and the turbulent flow causes intimate mixing of the reactants.

The halo-substitution reaction is exothermic and considerable heat is liberated during its execution. Overheating may be avoided and the temperature controlled by the use of conventional external and/or internal cooling means, by the use of normally gaseous diluents, or by the evaporation of an internally applied cooling agent. Temperature control is facilitated by employment of a relatively large excess of the organic reactant over the halogen in the reaction mixture, such excess functioning as a diluent.

The reaction may be effected with the reactants in substantially equimolecular amount, or with either in excess. When, for example, ethylene is reacted with chlorine to produce only, or substantially only, vinyl chloride, it is preferable to employ an excess of ethylene. The excess of the ethylene suppresses the formation of polyhalosubstitution products and increases the yield of vinyl chloride on the applied chlorine. The use of a relatively large excess of ethylene also facilitates temperature control. In general, when substantially only the vinyl monohalide is desired as the reaction product, mol ratios of ethylene to halogen as high as 10 to 1 may be successfully employed. The relative amounts of ethylene and the halogen applied will, of course, depend upon the particular product desired in predominant amount. For example, the attainment of a product predominating in a di- or trihalosubstituted ethylene will require a smaller ratio of ethylene to chlorine than would be suitable for the production of substantially only vinyl monochloride. When an excess of ethylene is applied, the unreacted ethylene may be separated from the halo-substitution product or products by rectification, condensation and/or other suitable means and recycled to the reactor or otherwise reutilized.

The reaction tube or chamber may be of any suitable material. Suitable reaction tube or chamber materials are: carbon, Hastelloy A, Hastelloy C, KA₂ steel, nickel, quartz, Monel metal and the like. When a metal reaction tube or chamber is used, the formation of carbon which is catalyzed by the metal surface of the preheating and/or reaction tube or chamber in contact with the organic materials may be inhibited by maintaining an effective concentration of hydrogen sulphide or an equivalent agent in the ethylene feed, or by pretreating such metallic surfaces with hydrogen sulphide or some other suitable agent.

The reaction may be effected at any suitable pressure. It is preferably effected in the gaseous phase at about atmospheric or moderately elevated pressures.

If desired, the rate of the halo-substitution reaction may be accelerated by the use of suitable agencies such as light and/or halogenation catalysts. When photochemical accelerating means are used, suitable light-giving devices, such as incandescent bulbs, ultra-violet ray lamps, etc., may be provided around a reaction tube or chamber constructed of a material, such as glass, quartz, etc., which permits passage through its walls of the reaction-accelerating light. Suitable halogenation catalysts, among others, which may be used are the antimony halides, the tin halides, carbon and the like. Other conditions being the same, the use of halogenation accelerating agencies such as light and/or catalysts may permit execution of the halo-substitution reaction at lower temperatures.

The space velocity or rate of passage of the reaction mixture through the reaction zone will depend upon the design of the reaction chamber (amount of surface available), upon the temperature employed, and upon the mol ratio of the organic reactant to the halogen in the mixture reacted. In general, good results are obtained by employing the maximum flows that can be reacted in a given reactor. Thus, the rate of production with the given equipment is at a maximum, substantially all of the halogen is reacted per single passage through the reactor, and the time during which the vinyl halide is maintained at the reaction temperature is reduced to a minimum.

The source of the applied ethylene or halo-substituted ethylene is immaterial. If desired, hydrocarbon mixtures containing ethylene may be treated. Paraffin-olefine mixtures containing a substantial amount of ethylene, such as the commercial ethane-ethene fraction, are suitable starting materials. When such a saturated hydrocarbon-containing mixture is treated, the saturated hydrocarbons in the treated mixture may also be halogenated, and the product will contain saturated as well as unsaturated products. In some cases, it may be desirable to form such saturated halogenated products as by-products of the halo-substitution process of the invention. The saturated and unsaturated products may be separated by any suitable means. Small amounts of water, oxygen, hydrogen sulphide and sulphur dioxide also appear to have no deleterious influence on the reaction. It may be desirable, from the standpoint of economics, to execute the reaction in the substantial absence of water. Hydrogen formed due to the occurrence of the water-gas reaction may react with the free halogen present and reduce the yield of vinyl halide on the applied halogen. The process may, if desired, be effected in the presence of a substantially inert diluent material, such as nitrogen.

In lieu of applying ethylene and effecting its halo-substitution to a vinyl monohalide and/or vinyl polyhalide, we may start with any halo-substituted ethylene and effect its substitution to one or a plurality of more highly halogenated ethylene halo-substitution products. For example, vinyl chloride may be chlor-substituted to a vinyl di-, tri-, or tetra-chloride, or a mixture of such higher chlorinated unsaturated products. Vinyl chloride may, for example, be subjected to a brom-substitution and converted to a brom-substituted vinyl chloride.

In lieu of the free halogens per se, we may apply any of the known free halogen-yielding substances which are capable of yielding a free halogen under the conditions existing in the reaction system.

To avoid the occurrence of undesired secondary reactions such as reaction of the applied ethylene and/or vinyl halide with a hydrogen halide (a product of the halo-substitution reaction), it may be desirable to cool and/or separate the hydrogen halide from the unsaturated organic materials or material in the effluent material from the reactor substantially as soon as it leaves the reactor. This may be accomplished in a variety of suitable manners. The effluent material may, for example, be contacted with a selective solvent for the hydrogen halide, such as water, in a suitable scrubbing apparatus, and the hydrogen halide thus separated. The vinyl halide may be separated from any ethylene which may be present by suitable rectification or extraction methods.

The invention is illustrated by the following examples which are presented for the purpose of illustrating suitable modes of executing the invention, and are not to be regarded as limitative in any sense.

*Example I*

Gaseous ethylene and chlorine were reacted in accordance with the process of the invention. The reaction was effected in a reaction tube having a diameter of 1¾" and a length of 22". The reaction tube was surrounded by an aluminum metal block to which heat was supplied by means of a gas furnace. Both the ethylene and the chlorine were preheated to about the same temperature. The preheated reactants were mixed and the mixture immediately passed into the reaction tube wherein the chlor-substitution reaction took place. The reaction temperature was measured by means of a jacketed thermocouple inserted into the reaction space. The data of a series of runs made under different conditions of space velocity, ratio of ethylene to chlorine, and temperature are tabulated below:

| Mol ratio $C_2H_4/Cl_2$ | Rate gms/min. $Cl_2$ | Space velocity per second | Pre-heater temp. | Average reaction temp. | Unreacted $Cl_2$ | HCl formed | Vinyl chloride yield |
|---|---|---|---|---|---|---|---|
| | | | °C. | °C. | Percent | Percent | Percent |
| 7.7 | 0.38 | 0.02 | 200 | 198 | 19.0 | 0.0 | 0.0 |
| 7.7 | 0.38 | 0.02 | 255 | 254 | 0.0 | 21.6 | 21.6 |
| 8.9 | 0.88 | 0.06 | 300 | 314 | 0.0 | 47.3 | 47.3 |
| 4.1 | 1.26 | 0.04 | 300 | 326 | 1.3 | 78.2 | 78.2 |
| 4.6 | 1.30 | 0.05 | 350 | 361 | 0.7 | 90.3 | 90.3 |
| 6.6 | 4.30 | 0.21 | 400 | 400 | 0.0 | 98.5 | 98.5 |

The tabulated data illustrate the influence of temperature on the course of the chlor-substitution reaction. At a reaction temperature of about 400° C., the yield of vinyl chloride was substantially quantitative. Good results may also be obtained by reacting the other halogens with ethylene in accordance with the process of the invention. The process is of particular value as applied to the technical scale production of vinyl chloride and vinyl bromide.

*Example II*

About 2.7 gm. per minute of chlorine were mixed, at a temperature of about 350° C., with vinyl chloride in the approximate mol ration of 1 mol of chlorine to 2.4 mols of vinyl chloride. The resultant mixture was passed into a reaction tube having a diameter of 1.6 cm. and a length of 60 cm. The reaction tube was surrounded by a steel block maintained at a temperature of 450° C. The reaction mixture attained a maximum temperature of 500° C. at a point 15 cm. from the entrance of the tube. The reacted mixture was passed directly from the tube to a water scrubber where the hydrogen chloride was recovered. The scrubbed reaction products were condensed and fractionated. The following products were obtained:

| | Mol percent of $Cl_2$ |
|---|---|
| 1,1 dichlor ethylene (B. P. 32° C.) | 12.8 |
| 1,2 dichlor ethylene (B. P. 58° C.) | 7.9 |
| High boiling material (probably polymer of dichlor ethylenes) | 18.5 |

This application is a continuation-in-part of our copending application, Serial No. 37,184, filed August 21, 1935.

We claim as our invention:

1. A process for the chlorination of ethylene to vinyl chloride by direct chlor-substitution at an elevated temperature which comprises subjecting ethylene to reaction with chlorine at a minimum temperature of from 300° C. to 500° C.

2. A process for the chlorination of ethylene to vinyl chloride by direct chlor-substitution at an elevated temperature which comprises subjecting ethylene to reaction with chlorine at a minimum temperature of from about 200° C. to 700° C.

3. A process for the chlorination of ethylene to vinyl chloride by direct chlor-substitution at an elevated temperature which comprises injecting chlorine into gaseous ethylene at a velocity exceeding that of flame propagation in the reaction mixture while effecting the chlor-substitution reaction at a minimum temperature of from 200° C. to 700° C.

4. A process for the chlorination of ethylene to vinyl chloride by direct chlor-substitution at an elevated temperature which comprises preheating ethylene to a minimum temperature of from 200° C. to 700° C. and then promptly injecting chlorine into said heated ethylene at a velocity in excess of that of flame propagation under the existing conditions to effect the chlor-substitution of the ethylene to vinyl chloride.

5. A process for the chlorination of ethylene to vinyl chloride by direct chlor-substitution at an elevated temperature which comprises separately preheating ethylene and chlorine to a temperature of from 200° C. to 700° C., mixing the two preheated reactants, rapidly passing the resultant mixture into a reaction zone, and effecting the chlor-substitution reaction whereby ethylene is converted to vinyl chloride at a minimum temperature of from 200° C. to 700° C.

6. A process for the chlorination of ethylene to vinyl chloride by direct chlor-substitution at an elevated temperature which comprises mixing ethylene and chlorine at a temperature of from 200° C. to 700° C. after at least one of said reactants has been preheated to a sufficiently high temperature to permit mixing at a temperature in said temperature range, and rapidly passing the resultant mixture into a reaction zone maintained at a minimum temperature of from 200° C. to 700° C. whereby the chlor-substitution of ethylene to vinyl chloride is effected.

7. A process for the chlorination of ethylene to vinyl chloride by direct chlor-substitution at an elevated temperature which comprises contacting chlorine with more than an equimolecular quantity of gaseous ethylene, and effecting reaction at a minimum temperature of from 200° C. to 700° C.

8. A process for the chlorination of ethylene to vinyl chloride by direct chlor-substitution at an elevated temperature which comprises subjecting ethylene to reaction with chlorine at a minimum temperature of at least 200° C. but below the temperature at which substantial degradation is favored.

9. A process for the halogenation of ethylene to a vinyl halide by halo-substitution at an elevated temperature which comprises contacting a halogen with more than an equivalent amount of ethylene, and effecting reaction at a minimum temperature of from 200° C. to 700° C.

10. A process for the halogenation of ethylene to a vinyl halide by halo-substitution at an elevated temperature which comprises mixing ethylene and a halogen at a temperature of from about 200° C. to 700° C. after at least one of said reactants has been preheated to a temperature sufficiently high to permit mixing of the reactants at a temperature in said temperature range, and rapidly passing the resultant mixture into a reaction zone maintained at a minimum temperature of from 200° C. to 700° C. whereby the halo-substitution of ethylene to a vinyl halide is effected.

11. A process for the halogenation of ethylene to a vinyl halide by direct halo-substitution at an elevated temperature which comprises injecting a halogen into a stream of gaseous ethylene at a velocity in excess of that of flame propagation in the resultant reaction mixture while effecting the halo-substitution of the ethylene at a minimum temperature of from 200° C. to 700° C.

12. A process for the halogenation of ethylene to a vinyl halide by direct halo-substitution at an elevated temperature which comprises preheating ethylene to a minimum temperature of from 200° C. to 700° C. and then promptly injecting a halogen in the gaseous state into said heated ethylene at a velocity in excess of that of flame propagation under the existing conditions to effect the halo-substitution of the ethylene to a vinyl halide.

13. A process for the halogenation of ethylene to a vinyl halide by direct halo-substitution at an elevated temperature which comprises subjecting ethylene to reaction with less than a stoichiometrical amount of a halogen at a minimum temperature of at least 200° C. but below the temperature at which substantial degradation is favored.

14. A process for the halogenation of ethylene to a vinyl halide by direct halo-substitution at an elevated temperature which comprises subjecting ethylene to reaction with a halogen at an elevated minimum temperature of at least 200° C. but below the temperature at which substantial degradation is favored.

15. A process for the halogenation by direct halo-substitution of an unsaturated organic compound of the class consisting of ethylene and its halo-substitution products containing at least one hydrogen atom which comprises subjecting such an unsaturated organic compound to reaction with a halogen at a minimum temperature of at least 200° C. but below the temperature at which substantial degradation is favored.

16. A process for the halogenation by direct halo-substitution of an unsaturated organic compound of the class consisting of ethylene and its halo-substitution products containing at least one hydrogen atom which comprises preheating the unsaturated organic compound to a minimum temperature of from 200 C. to 700° C. and then promptly injecting a halogen in the gaseous state into said heated unsaturated compound at a velocity in excess of that of flame propagation under the existing conditions to effect halo-substitution of the treated unsaturated compound.

17. A process for the halogenation by direct halo-substitution of an unsaturated organic compound of the class consisting of ethylene and its halo-substitution products containing at least one hydrogen atom which comprises mixing ethylene and a halogen at a temperature of from 200° C. to 700° C. after at least one of said reactants has been preheated to a temperature sufficiently high to permit mixing of the reactants at a temperature in said temperature range, and rapidly passing the resultant mixture into a reaction zone maintained at a minimum temperature of from 200° C. to 700° C. whereby the halo-substitution of ethylene to a vinyl halide is effected.

18. A process for the chlorination of an unsaturated organic compound of the class consisting of ethylene and its halo-substitution products containing at least one hydrogen atom to a vinyl type chloride by direct chlor-substitution which comprises subjecting the unsaturated organic compound to reaction with chlorine at a minimum temperature of from 200° C. to 700° C.

HERBERT P. A. GROLL.
GEORGE HEARNE.
JAMES BURGIN.
DONALD S. LA FRANCE.